US006984349B2

(12) United States Patent
Sheh et al.

(10) Patent No.: US 6,984,349 B2
(45) Date of Patent: Jan. 10, 2006

(54) MANUFACTURING METHOD FOR A REFRIGERATOR DOOR

(75) Inventors: Sheng-Hann Sheh, Tucheng (TW); Ching-Lung Tsai, Tucheng (TW)

(73) Assignee: Tatung Co., Ltd., Taipei (TW)

( * ) Notice: Subject to any disclaimer, the term of this patent is extended or adjusted under 35 U.S.C. 154(b) by 305 days.

(21) Appl. No.: 10/654,951

(22) Filed: Sep. 5, 2003

(65) Prior Publication Data

US 2004/0245666 A1 Dec. 9, 2004

(30) Foreign Application Priority Data

Jun. 3, 2003 (TW) .............................. 92115135 A

(51) Int. Cl.
*B29C 44/06* (2006.01)

(52) U.S. Cl. .................... 264/46.5; 264/46.8; 264/101; 264/132; 264/161; 264/511

(58) Field of Classification Search ............... 264/46.5, 264/46.8, 101, 511, 132, 161

See application file for complete search history.

(56) References Cited

U.S. PATENT DOCUMENTS

| | | | | |
|---|---|---|---|---|
| 2,976,577 | A * | 3/1961 | Gould | 264/46.6 |
| 2,977,639 | A * | 4/1961 | Barkhuff, Jr. | 264/45.4 |
| 3,733,381 | A * | 5/1973 | Willette et al. | 264/46.1 |
| 4,917,841 | A * | 4/1990 | Jenkins | 264/46.5 |
| 5,269,986 | A * | 12/1993 | Eisen et al. | 264/46.4 |
| 6,055,823 | A * | 5/2000 | Baker et al. | 62/265 |

* cited by examiner

*Primary Examiner*—Allan R. Kuhns
(74) *Attorney, Agent, or Firm*—Bacon & Thomas PLLC

(57) ABSTRACT

A manufacturing method for a refrigerator door is disclosed. The method uses only a transparent plastic layer to make the refrigerator door. The present invention can simplify the manufacturing process, and reduce the number of parts required for the refrigerator door to reduce costs. Furthermore, an appearance pattern on the refrigerator door can be painted or printed onto the surface of the transparent plastic layer with different types, and a male mold of a vacuum forming machine can provide different shapes to make the refrigerator door into variety shapes. Moreover, because the appearance pattern can be painted or printed on the inner surface of the transparent plastic layer, the appearance pattern will not come off because of frequent touching.

8 Claims, 7 Drawing Sheets

MANUFACTURING METHOD FOR A REFRIGERATOR DOOR

BACKGROUND OF THE INVENTION

1. Field of the Invention

The present invention relates to a manufacturing method for a refrigerator door and, more particularly, to a vacuum manufacturing method.

2. Description of the Related Art

In modern family life, the refrigerator has become an extremely important household electrical apparatus, which is used for cold storage so as to preserve food and to keep the food fresh.

A manufacturing method for a prior art refrigerator door will be described in the following with reference to FIG. 1 and FIG. 2. FIG. 1 is an exploded view drawing of a prior art refrigerator door. FIG. 2 is a sectional drawing of the refrigerator door. First, a thin steel board is punched and folded to form a door board 91. Later, an upper and a lower cover 92, 93, injected by way of a plastic injecting process, are placed on two surfaces of the door board 91 to form a door body. Finally, a PU foaming material is poured into the door body, and a door lining is pressed onto the PU foaming material to assemble the door lining to the door body, which composes the common refrigerator door.

However, the above-mentioned refrigerator door is composed of a door board 91, an upper cover 92 and a lower cover 93, so before pouring the PU foaming material into the door body 91, any gaps at the junction of these parts will be filled with the sponge material. Furthermore, the refrigerator door is composed of these different parts with different materials, which increases costs and complicates the manufacturing process. Plus, due to the characteristics of the thin steel material of the door body, the refrigerator door cannot have different appearances.

SUMMARY OF THE INVENTION

A main objective of the present invention is to provide a manufacturing method for a refrigerator door, which can simplify the manufacturing process and reduce the number of parts for the refrigerator door to reduce costs.

Another objective of the present invention is to provide a manufacturing method for a refrigerator door that can permit changes to the pattern and shape of the refrigerator door to increase the design varieties of refrigerator doors.

In order to achieve the above-mentioned objectives, the manufacturing method for a refrigerator door comprises following steps:

step A: printing an appearance pattern on an inner surface of a transparent plastic layer;

step B: placing the transparent plastic layer on a male mold of a vacuum forming machine, wherein the inner surface with the appearance pattern faces to the male mold of the vacuum forming machine;

step C: vacuum-forming the transparent plastic layer into a refrigerator door body;

step D: removing a burr from the refrigerator door body in periphery thereof;

step E: placing the refrigerator door body on a lower mold of a foaming jig, wherein the inner surface with the appearance pattern is facing up;

step F: pouring a PU foaming material into the inner surface of the refrigerator door body;

step G: covering a door lining on the PU foaming material and the refrigerator door body;

step H: closing the lower mold with an upper mold of the foaming jig, and pressure-foaming the PU foaming material into the refrigerator door;

step I: separating the lower mold and the upper mold of the foaming jig and extracting the refrigerator door.

In the above-mentioned steps, the appearance pattern can be painted or printed onto the inner surface of the transparent plastic layer. Moreover, the refrigerator door comprises a main body and a folded edge, and the vacuum forming machine makes the main body and the folded edge at the same time. Furthermore, the burr on the refrigerator door body can be removed by a blade or scissors.

Therefore, the present invention uses only the transparent plastic layer to make the refrigerator door. In the other words, the present invention can simplify the manufacturing process and reduce the number of parts required for the refrigerator door, thus reducing costs. Additionally, the appearance pattern on the refrigerator door can be painted or printed on the inner surface of the transparent plastic layer with different types, and the male mold of the vacuum forming machine can provide different shapes to make the refrigerator door into variety shapes. Moreover, another characteristic of the present invention is that the appearance pattern is printed or painted on the inner surface of the transparent plastic layer, and so the appearance pattern will not come off because of frequent touching.

The present invention can also use a non-transparent plastic layer, and in this case the appearance pattern is printed on an outer surface of the plastic layer, with the rest of steps being similar. This method is describe as follows:

step A: printing an appearance pattern on an outer surface of a plastic layer;

step B: placing the plastic layer on a male mold of a vacuum forming machine, wherein an inner surface of the plastic layer faces to the male mold of the vacuum forming machine;

step C: vacuum-forming the plastic layer into a refrigerator door body;

step D: removing a burr from the refrigerator door body in periphery thereof;

step E: placing the refrigerator door body on a lower mold of a foaming jig, wherein the outer surface with the appearance pattern is facing down;

step F: pouring a PU foaming material into the inner surface of the refrigerator door body;

step G: covering a door lining on the PU foaming material and the refrigerator door body;

step H: closing the lower mold with an upper mold of the foaming jig, and pressure-foaming the PU foaming material into the refrigerator door;

step I: separating the lower mold and the upper mold of the foaming jig and extracting the refrigerator door.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
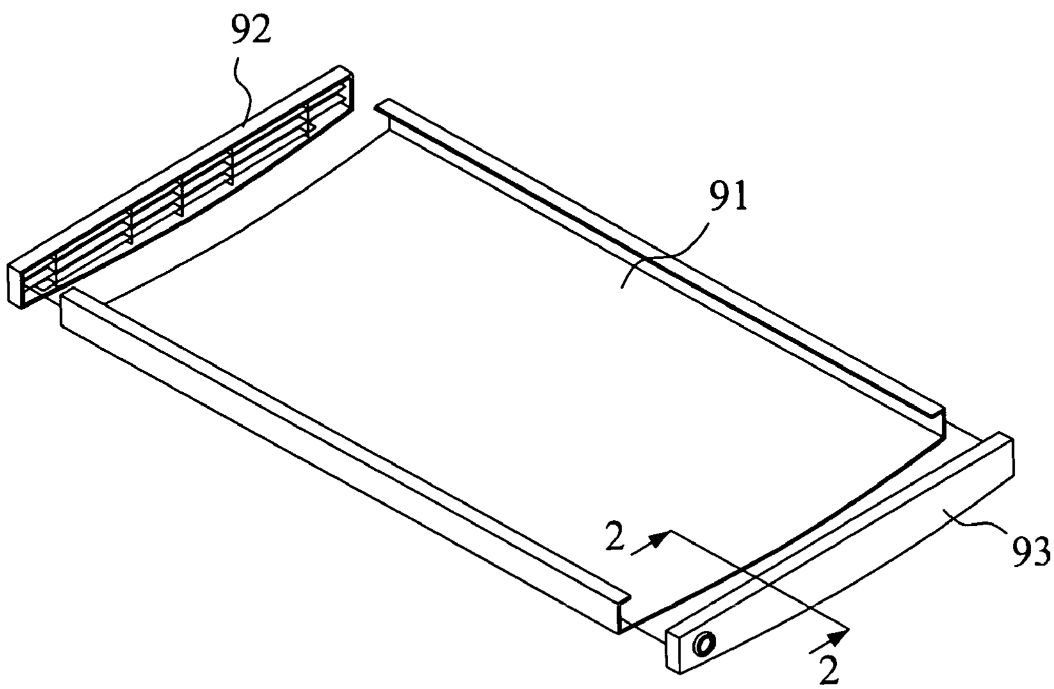
FIG. 1 is an exploded view of a prior art refrigerator door.
Figure 2:
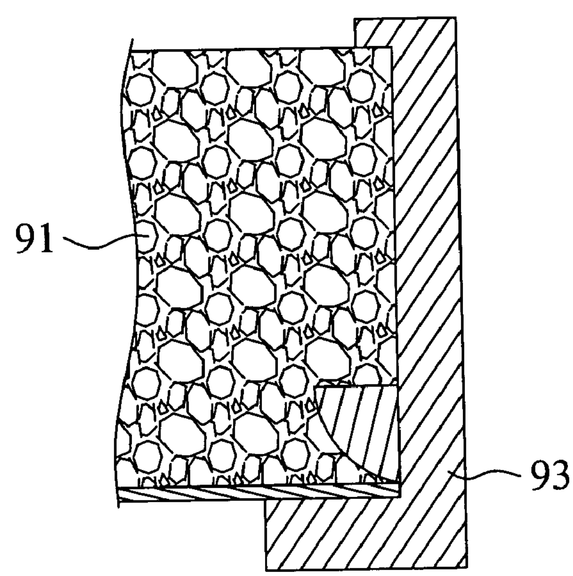
FIG. 2 is a sectional drawing of the refrigerator door of the FIG. 1.
Figure 3:
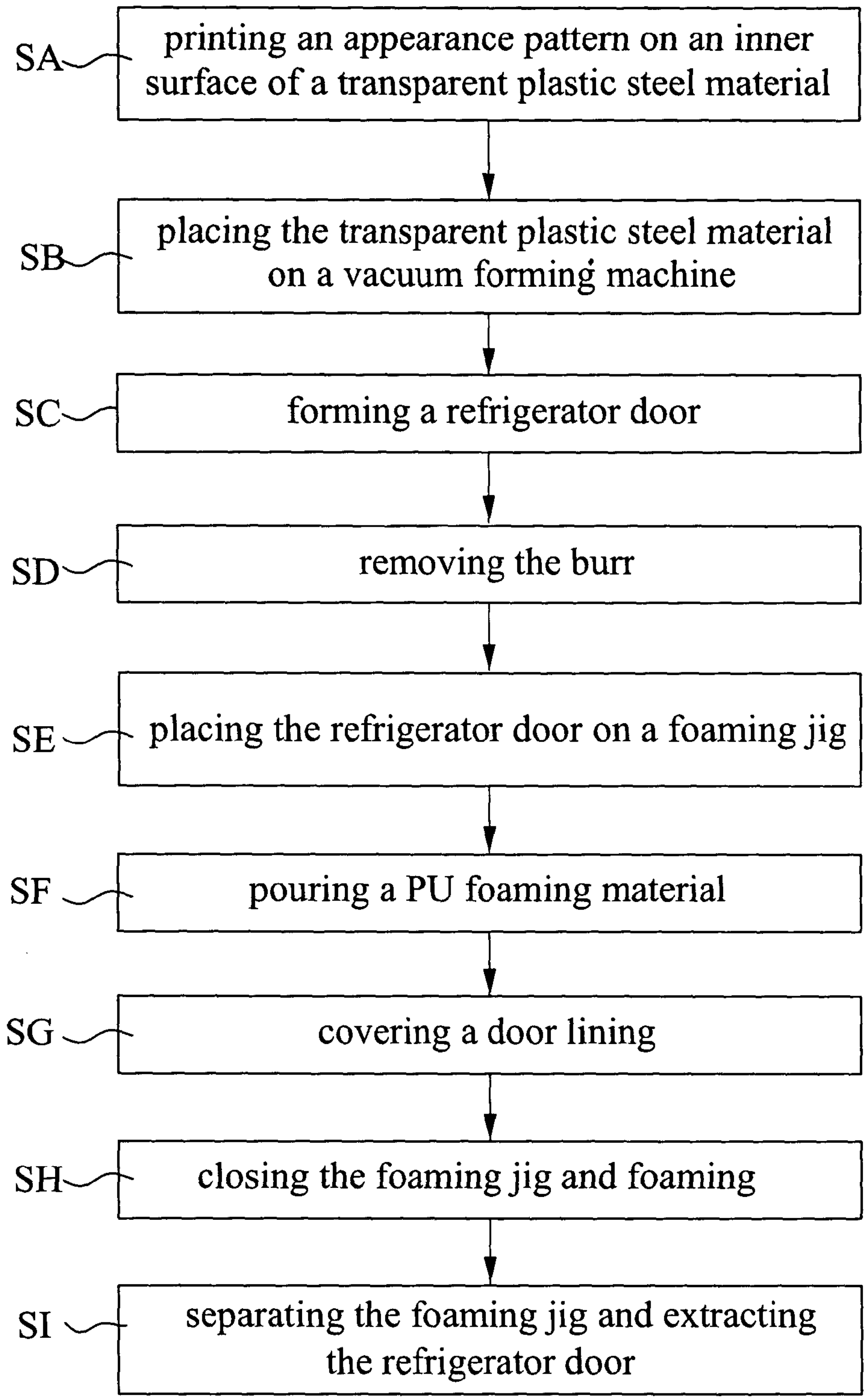
FIG. 3 is a flowchart of the present invention.
Figure 4:
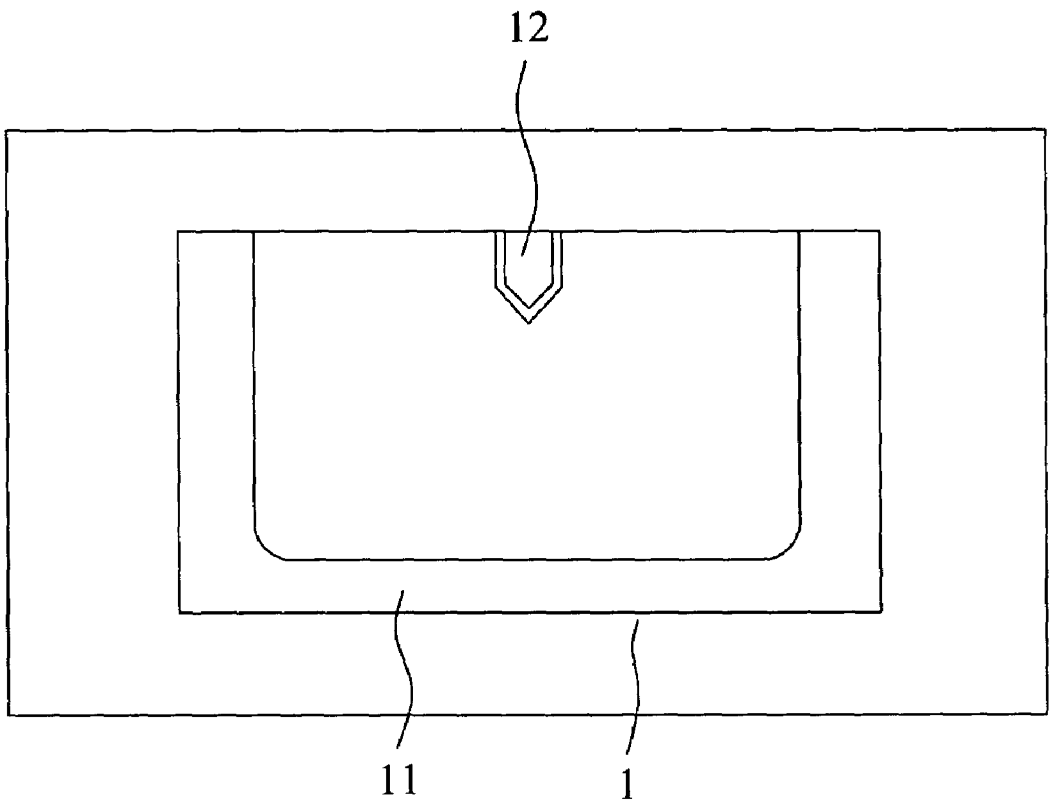
FIG. 4 is a first movement schematic drawing of the present invention.
Figure 5:
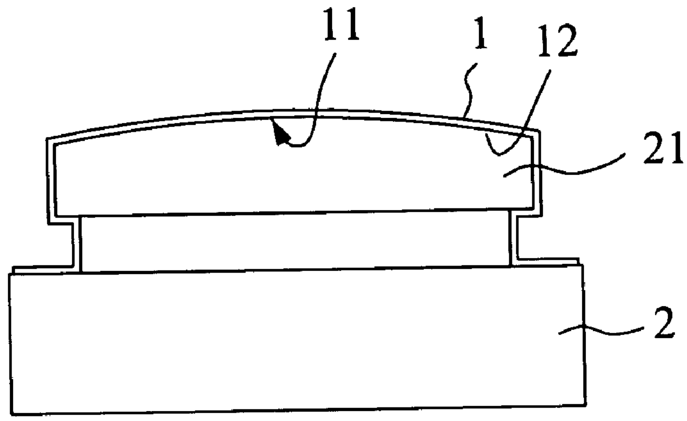
FIG. 5 is a second movement schematic drawing of the present invention.
Figure 6:
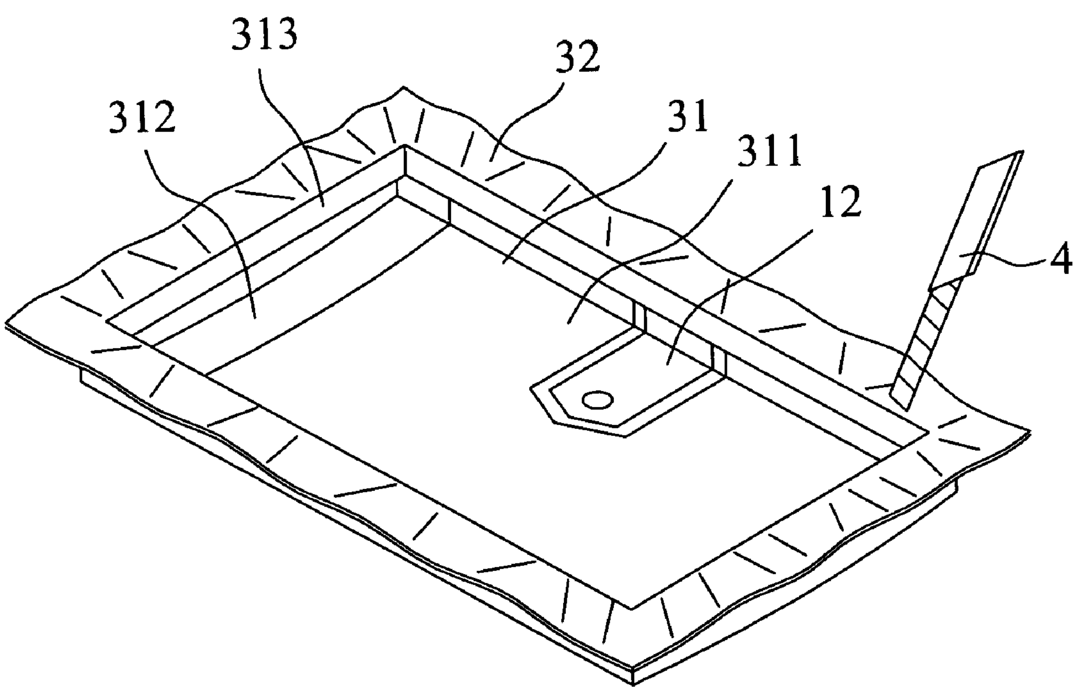
FIG. 6 is a third movement schematic drawing of the present invention.
Figure 7:
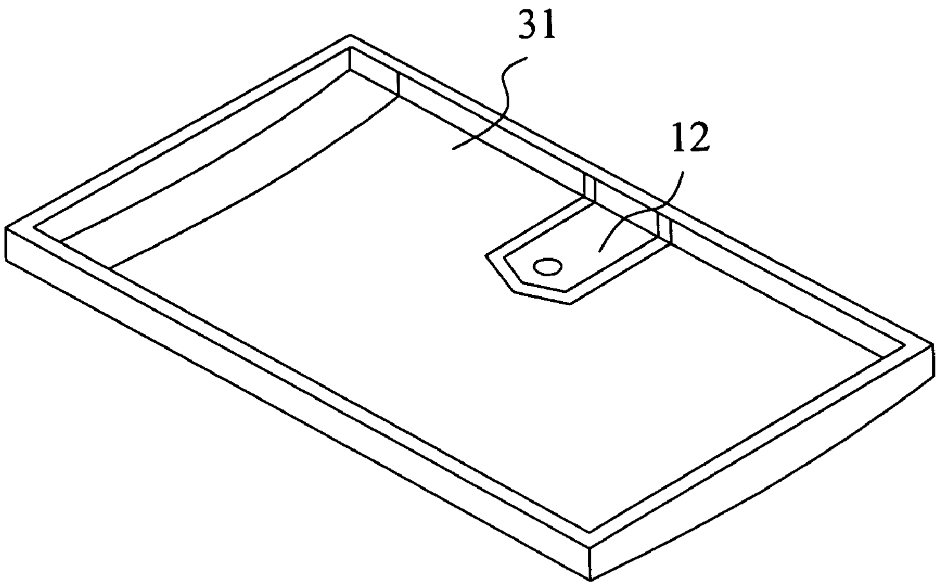
FIG. 7 is a fourth movement schematic drawing of the present invention.
Figure 8:
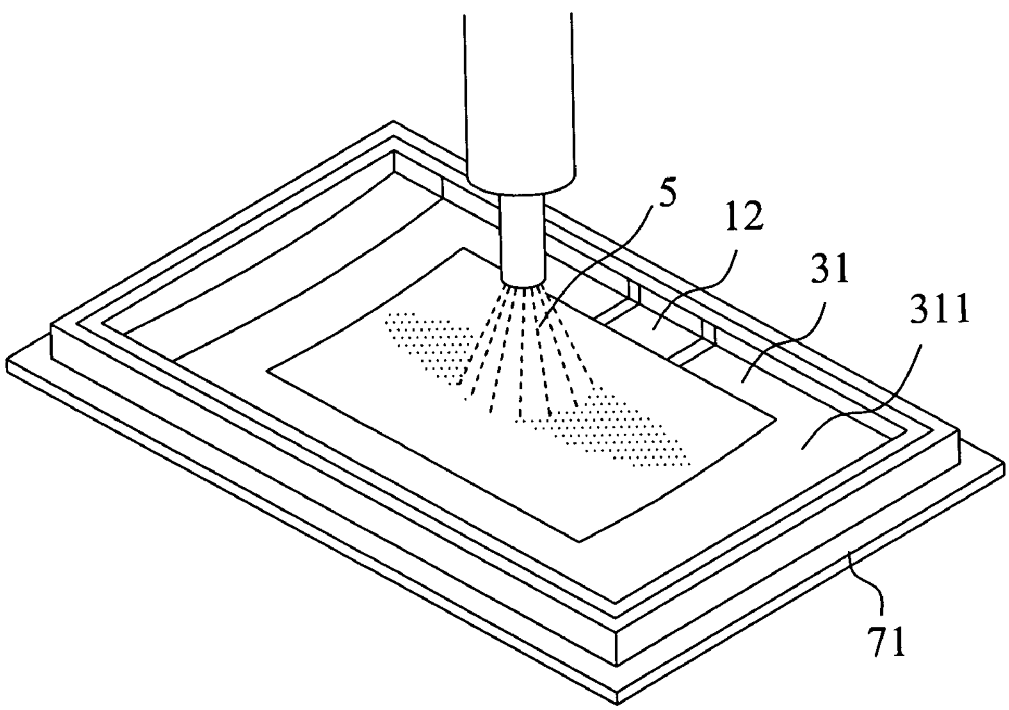
FIG. 8 is a fifth movement schematic drawing of the present invention.
Figure 9:
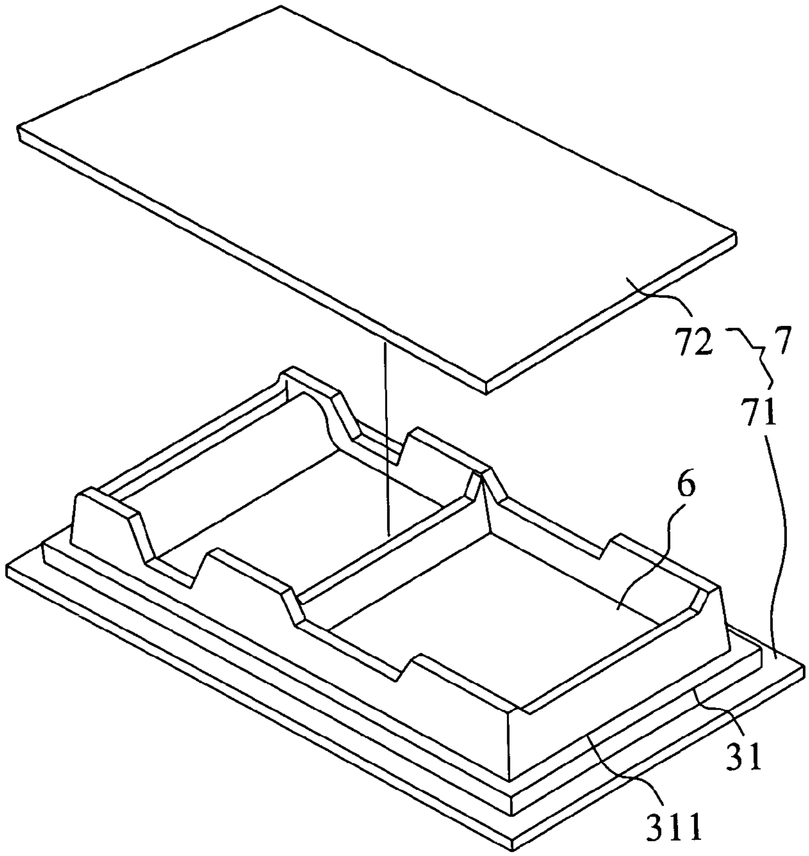
FIG. 9 is a sixth movement schematic drawing of the present invention.
Figure 10:
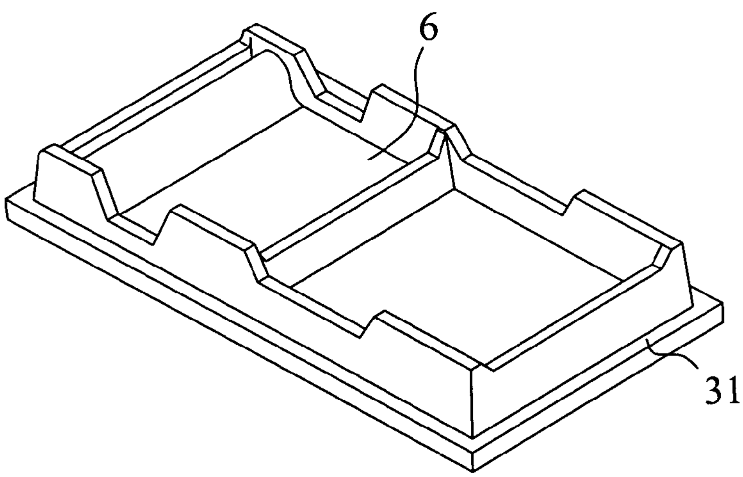
FIG. 10 is a seventh movement schematic drawing of the present invention.

Please refer to FIG. 3 to FIG. 10. FIG. 3 is a flowchart of the present invention. FIG. 4 is a first movement schematic drawing of the present invention. FIG. 5 is a second movement schematic drawing of the present invention. FIG. 6 is a third movement schematic drawing of the present invention. FIG. 7 is a fourth movement schematic drawing of the present invention. FIG. 8 is a fifth movement schematic drawing of the present invention. FIG. 9 is a sixth movement schematic drawing of the present invention. FIG. 10 is a seventh movement schematic drawing of the present invention.

In the manufacturing method of the present invention, an appearance pattern 12 is painted on an inner surface 11 of a transparent plastic layer 1 (step SA). In this embodiment, the appearance pattern 12 shows a rectangular stripe and an awl pattern, as shown in FIG. 4. The appearance pattern 12 can also be printed by ink on the inner surface 11 of a transparent plastic layer 1. The transparent plastic layer 1 with the printed appearance pattern 12 is placed on a male mold 21 of a vacuum forming machine 2, and the inner surface 11 of the transparent plastic layer 1 faces to the male mold 21 of the vacuum forming machine 2 (step SB), as shown in FIG. 5. Next, the vacuum forming machine 2 forms the transparent plastic layer 1 into a refrigerator door 31. The refrigerator door 31 comprises a main body 312 and a folded edge 313, and the vacuum forming machine 2 makes the main body 312 and the folded edge 313 at the same time. Furthermore, there is a burr 32 formed along the periphery of the transparent plastic layer 1, and the inner surface 11 in the center section of the transparent plastic layer 1 becomes an inner surface 311 of the refrigerator door 31 (step SC), as shown in FIG. 5 and FIG. 6.

After the refrigerator door 31 is formed, a cutting tool 4 can be used to remove the burr 32 (step SD), as shown in FIG. 6. In this embodiment, the cutting tool 4 is a blade, certainly the cutting tool 4 also can be any other equivalent tool, such as scissors. Then, the refrigerator door 31 (as shown in FIG. 7) is placed on a lower mold 71 of a foaming jig 7 (as shown in FIG. 9), wherein the inner surface 311 with the appearance pattern 12 is facing up (step SE), as shown in FIG. 8. Furthermore, a PU foaming material 5 is poured into the inner surface 311 of the refrigerator door 31 (step SF), as shown in FIG. 8.

After pouring the PU foaming material 5, a door lining 6 is used to cover the PU foaming material 5 and the refrigerator door 31 (step SG). As shown in FIG. 9, the door lining 6 is used for the placement of eggs and drinks or others. The lower mold 71 and an upper mold 72 of the foaming jig 7 are closed and the PU foaming material 5 is foaming, so that the door lining 6 is adhered onto the inner surface 311 of the refrigerator door 31 (step SH), as shown in FIG. 9. Finally, the lower mold 71 and the upper mold 72 of the foaming jig 7 are separated, and the refrigerator door 31 with the door lining 6 is extracted (step S1), as shown in FIG. 10.

As described above, the present invention uses only the transparent plastic layer 1, and the vacuum forming method to make the refrigerator door 31. In the other words, the present invention simplifies the manufacturing process, reduces the number of parts number required for the refrigerator door 31, and thus reduces costs. The appearance pattern 12 on the refrigerator door 31 can be painted or printed (by way of ink) onto the inner surface 11 of the transparent plastic layer 1 with different types, while the male mold 21 of the vacuum forming machine 2 can provide different shapes to make the refrigerator door 31 into variety shapes. An additional characteristic of the present invention is that the appearance pattern 12 is printed on the inner surface 11 of the transparent plastic layer 1, and so the appearance pattern 12 will not come off because of frequent touching.

However, the present invention can also use a non-transparent plastic layer, and in this case the appearance pattern is printed on an outer surface of the plastic layer, while the rest of the steps remain similar.

Figure 11:
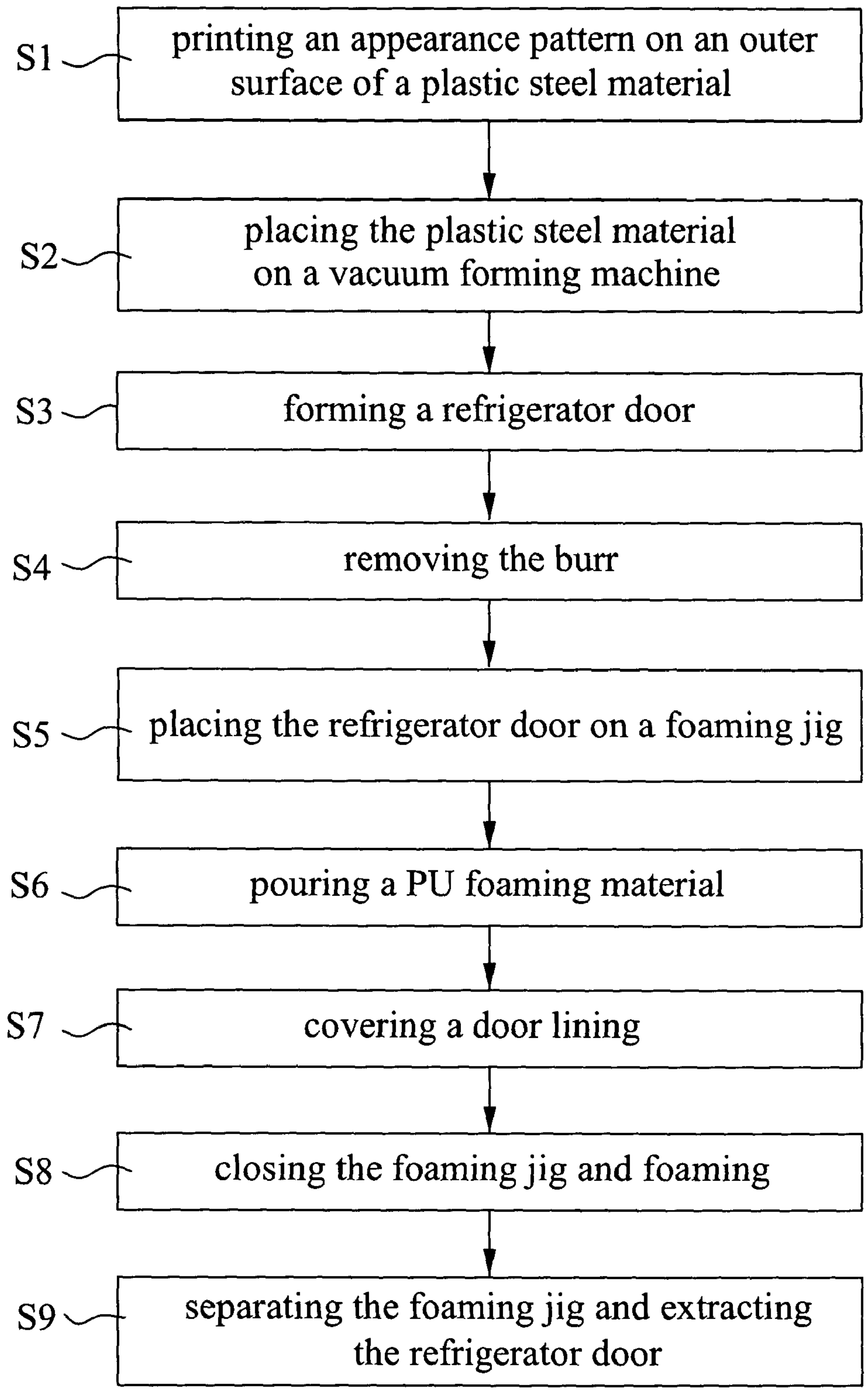
FIG. 11 is a flowchart of a second embodiment of the present invention.

Please refer to FIG. 11. FIG. 11 is a flowchart of a second embodiment of the present invention. This second embodiment is similar to the first embodiment. First, an appearance pattern is painted or printed onto an outer surface of a plastic layer (step S1). The plastic layer with the appearance pattern is placed on a male mold of a vacuum forming machine, with the inner surface of the plastic layer facing to the male mold of the vacuum forming machine (step S2). Forming the plastic layer into a refrigerator door, and a burr is formed along the periphery of the transparent plastic layer, and the outer surface in the center section of the plastic layer becomes an outer surface of the refrigerator door, and the appearance pattern is on the outer surface of the refrigerator door (step S3).

A cutting tool can be used to remove the burr (step S4). Then, the refrigerator door is placed on a lower mold of a foaming jig, wherein the outer surface with the appearance pattern is facing down (step S5). Furthermore, a PU foaming material is poured into the inner surface of the refrigerator door (step S6).

Last, a door lining is used to cover the PU foaming material and the refrigerator door (step S7). The lower mold and an upper mold of the foaming jig are closed and the PU foaming material is foaming, so that the door lining is adhered onto the inner surface of the refrigerator door (step S8). Finally, the lower mold and the upper mold of the foaming jig are separated and the refrigerator door with the door lining is extracted (step S9).

Similarly, the appearance pattern on the refrigerator door can be painted or printed onto the outer surface of the plastic layer. The refrigerator door comprises a main body and a folded edge, and the vacuum forming machine makes the main body and the folded edge at the same time. Furthermore, the burr of the refrigerator door can be removed by a blade or scissors or other equivalent tools.

The invention has been described using exemplary preferred embodiments. However, for those skilled in this field the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

Although the present invention has been explained in relation to its preferred embodiment, it is to be understood that many other possible modifications and variations can be made without departing from the spirit and scope of the invention as hereinafter claimed.

What is claimed is:

1. A manufacturing method for a refrigerator door, the method comprising:

step A: printing an appearance pattern on an inner surface of a transparent plastic layer;

step B: placing said transparent plastic layer on a male mold of a vacuum forming machine, wherein said inner surface with said appearance pattern faces to the male mold of said vacuum forming machine;

step C: vacuum-forming said transparent plastic layer into a refrigerator door body;

step D: removing a burr from said refrigerator door body in a periphery thereof;

step E: placing said refrigerator door body on a lower mold of a foaming jig, wherein said inner surface with said appearance pattern is facing up;

step F: pouring a PU foaming material into the inner surface of said refrigerator door body;

step G: covering a door lining on said PU foaming material and said refrigerator door body;

step H: closing said lower mold with an upper mold of said foaming jig, and pressure-foaming said PU foaming material into said refrigerator door;

step I: separating the lower mold and the upper mold of said foaming jig and extracting said refrigerator door.

2. The manufacturing method for a refrigerator door as claimed in claim 1, wherein in step A said appearance pattern is printed on the inner surface of said transparent plastic layer with painting.

3. The manufacturing method for a refrigerator door as claimed in claim 1, wherein in step C said refrigerator door body comprises a main body and a folded edge, and said vacuum forming machine makes said main body and said folded edge at the same time.

4. The manufacturing method for a refrigerator door as claimed in claim 1, wherein in step D said burr on said refrigerator door body is removed by a blade.

5. A manufacturing method for a refrigerator door, the method comprising:

step A: printing an appearance pattern on an outer surface of a plastic layer;

step B: placing said plastic layer on a male mold of a vacuum forming machine, wherein an inner surface of said plastic layer faces to the male mold of said vacuum forming machine;

step C: vacuum-forming said plastic layer into a refrigerator door body;

step D: removing a burr from said refrigerator door body in a periphery thereof;

step E: placing said refrigerator door body on a lower mold of a foaming jig, wherein said outer surface with said appearance pattern is facing down;

step F: pouring a PU foaming material into the inner surface of said refrigerator door body;

step G: covering a door lining on said PU foaming material and said refrigerator door body;

step H: closing said lower mold with an upper mold of said foaming jig, and pressure-foaming said PU foaming material into said refrigerator door;

step I: separating the lower mold and the upper mold of said foaming jig and extracting said refrigerator door.

6. The manufacturing method for a refrigerator door as claimed in claim 5, wherein in step A said appearance pattern is printed on the outer surface of said plastic layer with painting.

7. The manufacturing method for a refrigerator door as claimed in claim 5, wherein in step C said refrigerator door body comprises a main body and a folded edge, and said vacuum forming machine makes said main body and said folded edge at the same time.

8. The manufacturing method for a refrigerator door as claimed in claim 5, wherein in step D said burr on said refrigerator door body is removed by a blade.

* * * * *